March 10, 1942.  E. A. DEWALD  2,275,614
PULL-TYPE TUBE-EXPANDING TOOL
Filed Oct. 25, 1939
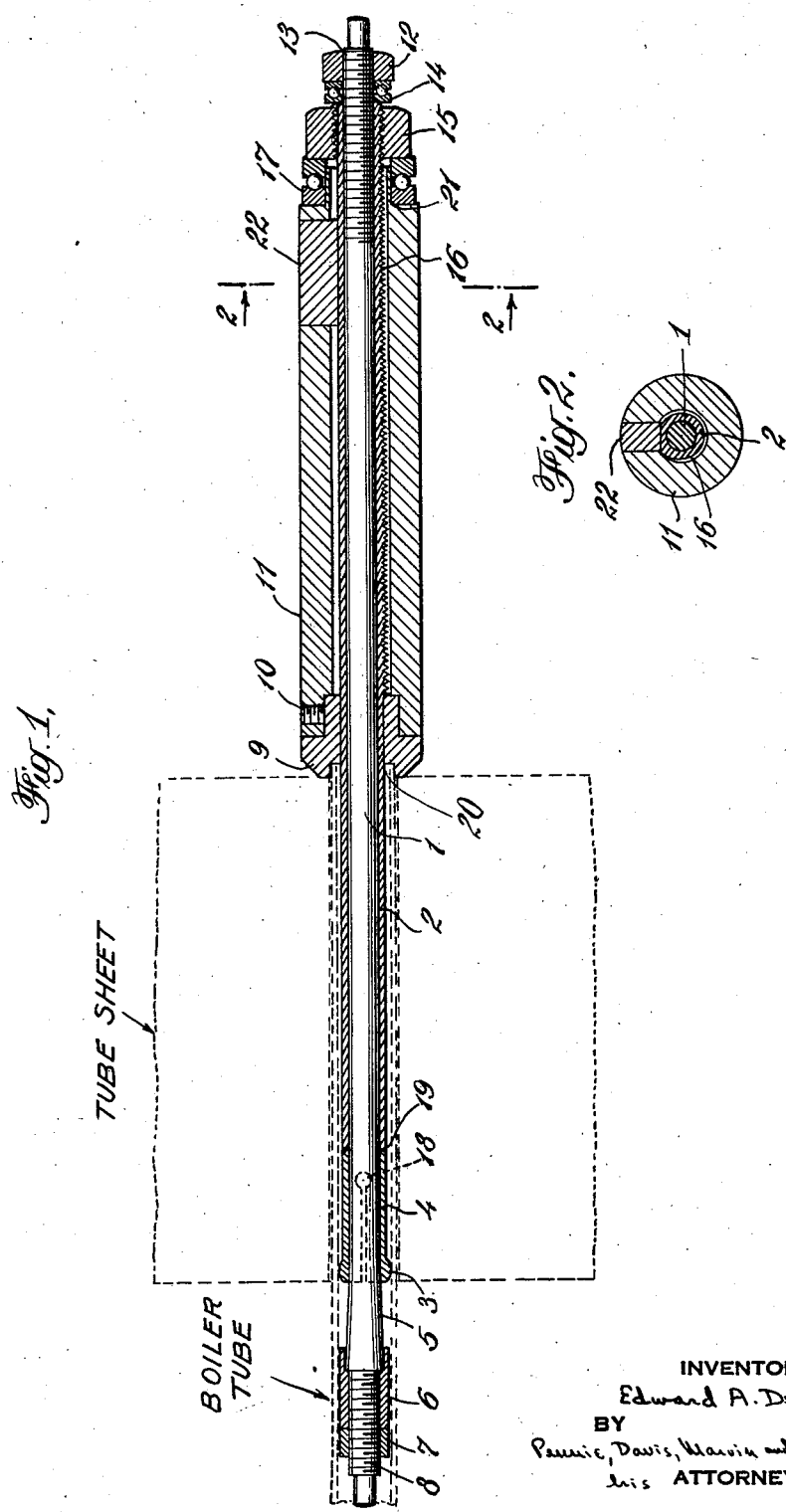
INVENTOR
Edward A. Dewald
BY
Pennie, Davis, Marvin and Edmonds
his ATTORNEYS Patented Mar. 10, 1942

2,275,614

UNITED STATES PATENT OFFICE 2,275,614

PULL-TYPE TUBE-EXPANDING TOOL

Edward Alexander Dewald, Massillon, Ohio, assignor, by mesne assignments, to The Babcock & Wilcox Company, Newark, N. J., a corporation of New Jersey Application October 25, 1939, Serial No. 301,092

8 Claims. (Cl. 153—80.5)

This invention relates to straight-line, pull-type, tube-expanding tools used particularly for expanding boiler and heat exchanger tubes into tube plates and drums.

In particular this invention provides a suitable, hand-operated actuating mechanism for use in manufacturing this type of apparatus in situations where working space is cramped and for repair work in the field. This tool is adapted effectually to operate a pull expander substantially of the type disclosed and claimed in the co-pending application of Maxwell, Serial No. 274,749, filed May 20, 1939, a motor-driven actuating mechanism for which is described and claimed in my co-pending application Serial No. 298,345, filed October 7, 1939.

In the accompanying drawing, Fig. 1 is a longitudinal section through a tool of my invention in place to be used, and Fig. 2 is a section on the line 2—2 of Fig. 1.

In the following specification and in the appended claims the words "outer" and "inner" and related terms will be used to connote a direction into or out of the tube to be expanded when the tool is in proper position to accomplish the expanding operation.

In the drawing the mandrel 1 having an outer threaded portion 13 and an inner threaded portion 8 at the opposite ends thereof is closely but slidably fitted inside the tube 2. The mandrel 1, immediately outward from the inner threaded portion 8 thereof, is enlarged. This enlarged portion is tapered throughout its own length to form the tapered portion 5 having its greatest diameter at its inner end.

The tube 2 has the threaded portion 16 at its outer end and the expanding head 4 welded as shown at 19 at its inner end. This expanding head 4 consists of a tube having four longitudinal slots equally spaced around its circumference extending outward from its inner end, one of which is illustrated at 18, and a split expander ring 3 formed on that inner end. The tube 2 is closely but slidably fitted into the end cup 9 and passes through the length of the barrel 11 to the inner end of which the end cup 9 is removably affixed by the set screw 10. The threads of the threaded portion 16 of the tube 2 are ground off on one side as shown in section in Fig. 2, providing a flat face along one side of the tube 2 which engages the inner face of the key 22 affixed into the barrel 11. This prevents the tube 2 from rotating as the nut 15 is screwed up.

Such elements as the elements 9 and 11 may be considered as parts of a barrel structure, one end of which is adapted to bear against the end of a tube to be expanded, and where such language is used in the claims, it is intended to cover a combination in which an element other than the cylindrical element 11 itself, may actually contact the tube to be expanded.

The large nut 15 engages the threaded portion 16 of the tube 2 and operates when tightened to draw the tube 2 back through the barrel 11 and end cup 9. The ease of rotation of the nut 15 is insured by the ball thrust bearing 17 placed around the tube 2 on the shoulder 21 of the barrel 11 and interposed between the outer end of the barrel 11 and the inner face of the nut 15. The small nut 12 engages the outer threaded portion 13 of the mandrel 1 and operates when tightened to draw the mandrel 1 back through the tube 2. The ease of rotation of the nut 12 is insured by the ball thrust bearing 14 between the outer end of the tube 2 and the inner face of the nut 12.

The adjusting sleeve 6 and locking sleeve 7 engaging the inner threaded portion 8 of the mandrel 1 act as a stop to limit the withdrawal of the mandrel 1 back through the tube 2, the outer face of the adjusting sleeve 6 being brought into contact with the inner face of the expander ring 3.

In the operation of my device the small nut 12 is retracted until the mandrel 1 may be positioned sufficiently far inward in the tube 2 entirely to remove the tapered portion 5 of the mandrel 1 from within the expanding head 4 of the tube 2. The inner end of the tool is then inserted into the boiler tube it is desired to expand until the outer end of that tube engages the end cup 9 in annular recess 20. The distance which the expander ring 3 enters the tube to be expanded may be controlled by adjustment of the large nut 15 to any desired depth within the capacity of the device. This depth is determined by the thickness of the tube sheet into which the boiler tube is to be expanded, it being desirable to commence the expansion just at the inner face of the tube sheet as indicated in the drawing.

Prior to the initiation of the actual expanding operation adjusting sleeve 6 is set and locked by the sleeve 7 in such a position that when the tightening of the small nut 12 brings the outer end of the sleeve 6 in contact with the inner face of the expander ring 3 the expanded diameter of the ring 3 (caused by the spreading of the segments of the expander head 4 as the tapered portion 5 of the mandrel 1 is drawn into the expanding head 4), will be the desired inside diameter of the expanded boiler tube. After insertion the small nut 12 is tightened until the adjusting sleeve 6 and expanding ring 3 are in contact, thus expanding the boiler tube at the point where the expanding ring 3 is placed. The large nut 15 is then tightened until the expanding ring 3 has been drawn outward through the portion of tube to be expanded. The device is then removed from the work.

In the operation of my device it will be observed that the contact between the adjusting sleeve 6 and the expander ring 3 is maintained throughout the expanding operation by the clamping action of the small nut 12 bearing against the outer end of the tube 2 through the ball thrust bearing 14.

In constructing my device the barrel 11 is preferably made of soft steel with its outer surface knurled, the end cup 9, of a hardened tool steel and the tube 2, of seamless steel tubing. The expanding head 4 welded to the tube 2 is preferably made of oil hardened steel and the mandrel 1, of heat-treated steel of high tensile strength. Where practicable the operation of my device is best effected with an air wrench, particularly in the tightening of the large nut 15, since by use of controlled pressure in the operation of the wrench a substantial uniformity in the expanding of the boiler tubes can be obtained. However, good results can also be obtained, particularly in very close spaces, by the use of hand-operated ratchet wrenches. My device provides a novel and useful tool for achieving the superior results of the larger devices disclosed in the co-pending applications previously referred to in expanding inaccessible tubes and also in repairing installations in the field.

It has been found in practice when using my device that the best results are obtained by turning the tool through an angle of 45° about its axis and repeating the expanding operation exactly as hereinbefore described. This second operation brings the solid portions of the split ring expander in contact with the boiler tube where the split portions had been at the first operation and serves to iron out the ridges left by those split portions thus leaving the inside of the expanded tube perfectly cylindrical.

While I have described and illustrated what I believe to be the best practical embodiment of my invention, it is to be understood that certain variations will suggest themselves to those skilled in the art which are a part of the substance of my invention. For a definition, therefore, of what I believe to be novel and substantial in my invention attention is directed to the appended claims.

I claim:

1. In a tube expanding device, a tubular member, a mandrel within said tubular member extending beyond said tubular member at both ends thereof, said mandrel having an enlarged portion at its inner end tapering outwardly and having a stop at the inner end of said tapering portion and said tubular member having a longitudinally spit portion and a spilt expander ring at its inner end, said expander ring being adapted to be expanded by the tapering portion of said mandrel when brought into contact with the stop thereon, a barrel structure encasing a portion of said tubular member, said barrel structure having an inner end adapted to bear against a tube to be expanded, a threaded portion on the outer end of said tubular member, a nut engaging said threaded portion of said tubular member and bearing against the outer end of said barrel structure, a threaded portion on the outer end of said mandrel and a nut engaging said threaded portion of said mandrel and bearing against the outer end of said tubular member.

2. In a tube expanding device, a tubular member, a mandrel within said tubular member extending beyond said tubular member at both ends thereof, said mandrel having an enlarged portion at its inner end tapering outwardly and having a stop at the inner end of said tapering portion, said tubular member having a longitudinally split portion and a split expander ring at its inner end, said expander ring being adapted to be expanded by the tapering portion of said mandrel when brought into contact with the stop thereon, a barrel structure encasing a portion of said tubular member, said barrel structure having an inner end adapted to bear against a tube to be expanded, a threaded portion on the outer end of said tubular member, a nut engaging said threaded portion of said tubular member, an anti-friction thrust bearing interposed relative to said nut and the outer end of said barrel structure, a threaded portion on the outer end of said mandrel, a nut engaging said threaded portion of said mandrel, and an anti-friction thrust bearing interposed relative to said nut and the outer end of said tubular member.

3. In a tube expanding device, a tubular member, a mandrel within said tubular member extending beyond said tubular member at both ends thereof, said mandrel having an enlarged portion at its inner end tapering outwardly and having an adjustable stop at the inner end of said tapering portion and said tubular member having a longitudinally split portion and a split expander ring at its inner end, said expander ring being adapted to be expanded by the tapering portion of said mandrel when brought into contact with the adjustable stop thereon, a barrel structure encasing a portion of said tubular member, said barrel structure having an annular recess on its inner end concentric with said mandrel adapted to bear against and to center said mandrel in the tube to be expanded and to center said mandrel therein, a threaded portion on the outer end of said tubular member, a nut engaging said threaded portion of said tubular member, an anti-friction thrust bearing interposed relative to said nut and the outer end of said barrel structure, a threaded portion on the outer end of said mandrel, a nut engaging said threaded portion of said mandrel and an anti-friction thrust bearing between said nut and the outer end of said tubular member.

4. A tube expanding tool comprising a tubular member having at its inner end a split expander head, means for expanding said head, locking means for maintaining the expansion of said head during movement of said tubular member, a threaded portion on the outer end of said tubular member, a barrel structure encasing said tubular member adapted at its inner end to bear against a tube to be expanded, and a nut engaging the threaded portion of said tubular member and bearing against the outer end of said barrel structure and an anti-friction bearing between said nut and the outer end of said barrel structure.

5. A tube expanding tool comprising a tubular member having at its inner end a split expander head, means for expanding said head, locking means for maintaining the expansion of said head during movement of said tubular member, a threaded portion on the outer end of said tubular member, said threaded portion having a flattened face, a barrel structure encasing said tubular member adapted at its inner end to bear against a tube to be expanded, said barrel structure having a key affixed therein the inner face of which bears on the flattened face of the threaded portion of said tubular member, and a nut engaging the threaded portion of said tubular member and bearing against the outer end of said barrel structure.

6. A tube expanding tool comprising a tubular member having at its inner end a split expander head, means for expanding said head, locking means for maintaining the expansion of said head during movement of said tubular member, a threaded portion on the outer end of said tubular member, a barrel structure encasing said tubular member adapted at its inner end to bear against a tube to be expanded, key means intermediate said tubular member and said barrel structure preventing their relative rotation, and a nut engaging the threaded portion of said tubular member and bearing against the outer end of said barrel structure.

7. A tube expanding tool comprising a barrel structure adapted at its inner end to bear against the tube to be expanded, a tubular member slidably mounted within said barrel structure and having at its inner end a split expander head, means for expanding said head, locking means for maintaining the expansion of said head during movement of said tubular member, a threaded portion on the outer end of said tubular member, and a nut engaging the threaded portion of said tubular member and bearing against the outer end of said barrel structure, the turning of said nut operating to cause the withdrawing of the expanded head from the tube.

8. A manually operated mechanical tube expander for making a pressure tight connection between a tube and a wall formed with tube seat in which an end portion of the tube is fitted, a rod-like mandrel adapted to slide freely within said end portion and having an upwardly tapered section near one end, a sectional expander head encircling the mandrel and slidably mounted thereon, said expander head being adapted to slide freely within said tube in its retracted condition but being expansible by relative movement between it and said tapered section to expand a portion of the tube against the tube seat, means including a part in screw threaded engagement with the mandrel for holding or locking the expander head in its expanded condition, and means for pulling the expander out of the tube seat portion of the tube while the expander head is locked in its expanded condition.

EDWARD ALEXANDER DEWALD.

CERTIFICATE OF CORRECTION.

Patent No. 2,275,614. March 10, 1942.

EDWARD ALEXANDER DEWALD.

It is hereby certified that error appears in the printed specification of the above numbered patent requiring correction as follows: Page 2, first column, line 67, claim 1, for "spit portion and a spilt" read --split portion and a split--; and second column, line 48, claim 3, strike out "and to center said mandrel therein"; and that the said Letters Patent should be read with this correction therein that the same may conform to the record of the case in the Patent Office.

Signed and sealed this 2nd day of February, A. D. 1943.

(Seal)

Henry Van Arsdale,
Acting Commissioner of Patents.